United States Patent
Massieu

(10) Patent No.: US 7,407,105 B2
(45) Date of Patent: Aug. 5, 2008

(54) APPARATUS FOR DIAGONAL PROGRESSIVE SCANNING VIDEO AND METHOD OF IMPROVING AIMING VISIBILITY, REDUCING TILT DEPENDENCE AND IMPROVING READ RANGE

(75) Inventor: Jean-Louis Massieu, Montauban (FR)

(73) Assignee: Intermec IP Corp., Everett, WA (US)

( * ) Notice: Subject to any disclaimer, the term of this patent is extended or adjusted under 35 U.S.C. 154(b) by 25 days.

(21) Appl. No.: 11/215,331

(22) Filed: Aug. 30, 2005

(65) Prior Publication Data
US 2006/0076417 A1      Apr. 13, 2006

Related U.S. Application Data

(60) Provisional application No. 60/635,263, filed on Dec. 10, 2004, provisional application No. 60/605,657, filed on Aug. 30, 2004.

(51) Int. Cl.
*G03B 7/08*      (2006.01)

(52) U.S. Cl. ............. 235/462.24; 235/454; 235/462.22; 235/462.23

(58) Field of Classification Search ................ 235/462, 235/462.01, 472.01, 454, 462.22–462.24
See application file for complete search history.

(56) References Cited

U.S. PATENT DOCUMENTS

| | | | |
|---|---|---|---|
| 3,998,092 A | 12/1976 | Maccabee | 73/71.3 |
| 4,006,970 A | 2/1977 | Slater et al. | 350/285 |
| 4,009,369 A * | 2/1977 | Hayosh et al. | 235/462.39 |
| 4,180,822 A | 12/1979 | Hudson et al. | 346/108 |
| 4,230,393 A | 10/1980 | Burke, Jr. | 350/6.5 |
| 4,538,880 A | 9/1985 | Reinhold | 350/6.6 |
| 4,743,773 A * | 5/1988 | Katana et al. | 235/462.07 |
| 5,136,414 A | 8/1992 | Jenkins | 359/214 |
| 5,280,165 A | 1/1994 | Dvorkis et al. | 235/470 |
| 5,532,467 A * | 7/1996 | Roustaei | 235/462.42 |

(Continued)

FOREIGN PATENT DOCUMENTS

EP      1 123 526      7/2002

(Continued)

OTHER PUBLICATIONS

Lakner et al., "Micromirrors for Direct Writing Systems and Scanners," *Proc. of SPIE* 3878:217-229, Sep. 1999.

(Continued)

*Primary Examiner*—Steven S Paik
*Assistant Examiner*—Tuyen K Vo
(74) *Attorney, Agent, or Firm*—Seed IP Law Group PLLC

(57) ABSTRACT

A laser scanner with a 2D resonant electrostatic micro-mirror has improved aiming visibility, reduced tilt dependence and improved read range. The laser scanner has a field of view that defines a 3D volume and utilizes a laser beam in a light path that is thin relative to the 3D volume. Physical pixel height is enlarged to aid optical imaging plane alignment. A selective filter centered on the lighting wavelength is placed in the image path. The height of the pixel may be artificially induced to be m*w, where m is the lens magnification and w is the light thickness. Diagonal progressive scanning is used to maximize the frequency values so shock resistance of the mirror is increased.

24 Claims, 4 Drawing Sheets

U.S. PATENT DOCUMENTS

| | | | |
|---|---|---|---|
| 5,600,119 A | | 2/1997 | Dvorkis et al. ............... 235/462 |
| 5,614,706 A | * | 3/1997 | Bard et al. ............. 235/462.36 |
| 5,629,790 A | | 5/1997 | Neukermans et al. ....... 359/198 |
| 5,648,618 A | | 7/1997 | Neukermans et al. .... 73/862.08 |
| 5,742,419 A | | 4/1998 | Dickensheets et al. ...... 359/201 |
| 5,777,314 A | * | 7/1998 | Roustaei ................ 235/462.42 |
| 5,786,582 A | * | 7/1998 | Roustaei et al. ........ 235/462.07 |
| 5,786,924 A | | 7/1998 | Black et al. ................. 359/197 |
| 5,821,521 A | | 10/1998 | Bridgelall et al. ........... 235/462 |
| 5,844,222 A | | 12/1998 | Ackley et al. ............... 235/454 |
| 5,854,705 A | | 12/1998 | Apte et al. .................. 359/196 |
| 5,907,425 A | | 5/1999 | Dickensheets et al. ...... 359/224 |
| 5,932,860 A | | 8/1999 | Plesko ........................ 235/454 |
| 6,007,208 A | | 12/1999 | Dickensheets et al. ...... 359/872 |
| 6,010,071 A | * | 1/2000 | Bard et al. ............. 235/462.43 |
| 6,118,569 A | | 9/2000 | Plesko ........................ 359/202 |
| 6,154,305 A | | 11/2000 | Dickensheets et al. ...... 359/225 |
| 6,201,629 B1 | | 3/2001 | McClelland et al. ........ 359/223 |
| 6,232,861 B1 | | 5/2001 | Asada ......................... 335/222 |
| 6,256,131 B1 | | 7/2001 | Wine et al. .................. 359/199 |
| 6,285,489 B1 | | 9/2001 | Helsel et al. ................. 359/291 |
| 6,331,909 B1 | | 12/2001 | Dunfield ...................... 359/199 |
| 6,404,313 B2 | | 6/2002 | Asada ......................... 335/222 |
| 6,433,907 B1 | | 8/2002 | Lippert et al. ............... 359/201 |
| 6,445,362 B1 | | 9/2002 | Tegreene ....................... 345/7 |
| 6,449,079 B1 | | 9/2002 | Herrmann ................... 359/214 |
| 6,512,622 B2 | | 1/2003 | Wine et al. .................. 359/199 |
| 6,535,325 B2 | | 3/2003 | Helsel et al. ................. 359/291 |
| 6,595,055 B1 | | 7/2003 | Schenk et al. ............ 73/514.15 |
| 6,654,158 B2 | | 11/2003 | Helsel et al. ................. 359/292 |
| 6,661,393 B2 | | 12/2003 | Tegreene et al. ............... 345/7 |
| 6,687,034 B2 | | 2/2004 | Wine et al. .................. 359/198 |
| 6,732,451 B2 | | 5/2004 | Conwell et al. ............... 34/275 |
| 6,749,346 B1 | | 6/2004 | Dickensheets et al. ........ 385/88 |
| 6,762,867 B2 | | 7/2004 | Lippert et al. ............... 359/201 |
| 6,843,568 B2 | | 1/2005 | Schenk et al. ................. 353/46 |
| 6,879,428 B2 | | 4/2005 | Massieu ..................... 359/290 |
| 6,882,462 B2 | | 4/2005 | Helsel et al. ................. 359/292 |
| 6,994,256 B2 | * | 2/2006 | Shimizu et al. ........ 235/462.37 |
| 2002/0008863 A1 | * | 1/2002 | Taniguchi et al. ............. 355/55 |

FOREIGN PATENT DOCUMENTS

WO      WO 00/25170      5/2000

OTHER PUBLICATIONS

Schenk et al., "A New Driving Principle for Micromechanical Torsional Actuators," *Microelectromechanical Systems (MEMS)* 1:333-338, 1999.

Schenk et al., "Drive for Micromechanical Scanner Mirrors," *Elektronik 24*:1-7, 1999 (with translation).

Schenk et al., "An Electrostatically Excited 2D-Micro-Scanning-Mirror with an In-Plane Configuration of the Driving Electrodes," *IEEE*, Fraunhofer Institute of Microelectronic Circuits and Systems, University of Stuttgart, Stuttgart, Germany, pp. 473-478, 2000.

Schenk et al., "Large Deflection Micromechanical Scanning Mirrors for Linear Scans and Pattern Generation," *IEEE Journal of Selected Topics in Quantum Electronics* 6(5):715-722, Sep./Oct. 2000.

Schenk et al., "A Resonantly Excited 2D-Micro-Scanning-Mirror with Large Deflection," *Sensors and Actuators A 89*:104-111, 2001.

Schenk et al., "Design and Modelling of Large Deflection Micromechanical 1D and 2D Scanning Mirrors," *Proceedings of SPIE 4178*:116-125, 2000.

Schenk et al., "A Novel Electrostatically Driven Torsional Actuator," *3rd International Conference on Micro Opto Electro Mechanical Systems (Optical MEMS)*, pp. 3-10, Sep. 1, 1999.

Schenk, "A Novel Microactuator for One-and Two-Dimensional Deflection of Light," Dissertation approved by the Specialty Area Electrode Technology of the Gerhard Mercator Comprehensive University, pp. 1-99, Dec. 15, 2000 (with translation).

* cited by examiner

APPARATUS FOR DIAGONAL PROGRESSIVE SCANNING VIDEO AND METHOD OF IMPROVING AIMING VISIBILITY, REDUCING TILT DEPENDENCE AND IMPROVING READ RANGE

CROSS-REFERENCE TO RELATED APPLICATION

The present application claims the benefit of U.S. Provisional Application No. 60/605,657 filed 30 Aug. 2004 entitled Method of Improving Aiming Visibility Reducing Tilt Dependence and Improving Read Range of Bar Code and U.S. Provisional Application No. 60/635,263 filed 10 Dec. 2004 entitled Method and Apparatus For Diagonal Progressive Scanning Video With A Resonant Electrostatic Silicon Mirror.

U.S. Provisional Application No. 60/605,657 and U.S. Provisional Application No. 60/635,263 are incorporated herein by reference.

BACKGROUND

1. Technical Field

The present invention relates to scanners and bar code readers. More particularly it relates to a laser scanner having 2-D resonant electrostatic micro-mirror that enables projection or acquisition of a discrete image. The present invention also relates to a method of improving aiming visibility, reducing tilt dependence and improving read range of solid state 1D/2D stacked bar code readers.

2. Description of the Related Art

Two primary types of prior art scanners and bar code readers include solid state readers and laser scanners. Solid state bar code readers include CCD (charge coupled device) and CMOS (complimentary metal oxide semiconductor) readers. CCD readers use a row or array of photocells. A line or rectangular areas of a bar code is illuminated by a light source, typically LEDs built into the scanner. A 1D bar code is typically a pattern of light and dark lines of varying width. A 1D bar code does not vary vertically. Information is stored along only 1-dimension, the width, of a 1D bar code. A 1D bar code can be read with a reader having a line of LEDs illuminating a line across the width of the bar code.

There are many types of 2D bar codes. A 2D bar code may use stack bar code symbology, a multi-row code or a matrix symbology. A 2D bar code stores information along the width and height of the bar code. The pattern varies both horizontally and vertically. To read a 2D bar code, the scanner needs to have an array of LEDs illuminating the rectangular area of the 2D bar code.

The photosensors 20 in the CCD scanners reads the bar code illuminated by the light source. CMOS readers also capture light on a grid of small photosensors 20. Prior art solid state bar code scanners rely on a lighting path 22 encompassing the image plane and the 3D volume of view 26.

Because the lighting path must encompass the 3D volume of view, prior art solid state bar code scanners can only "read" what is illuminated. Thus, one disadvantage is that these readers cannot be used with bar codes that are wider or larger than the lighting path.

A CCD scanner does not have to be in direct contact with the surface of the bar code; however, its depth of focus is limited. Thus, another disadvantage is that these prior art scanners cannot be used for far field scanning. CCD scanners suffer from low brightness when used at a far field. Further, there is low photometric coupling efficiency. In other words a portion of the light is not captured by the photosensors 20.

Yet another disadvantage with prior art readers, is that they are tilt dependent when reading high-resolution 1D bar codes and thin row 2D stacked bar codes. In other words, the scanner works significantly better when the light is substantially perpendicular to the bar code. The scanning ability is diminished as the light hits the bar codes from a greater or lesser angle such as occurs when the scanner is tilted.

Laser scanners use a moving light source to illuminate the bar code and a photocell receives the light reflected from the bar code. Oscillating mirror(s) sweep the beam across the bar code. The beam can be swept horizontally to read 1D bar codes or the beam can sweep horizontally and vertically in a raster pattern to read 2D bar codes. Because the light emitted from a laser diverges very little as it travels, laser scanners can be used at far field.

In raster scanning, two mirrors scanning in orthogonal directions or one mirror scanning in two dimensions, and a modulated light source generates a 2-D image on a screen.

In other laser scanners, an optical imaging of a line of pixels or matrix of pixels is swept over the scene by a scanning mirror to image the scene as a whole. Pixels can be diffractive or reflective elements.

In digital light processing (DLP) displays, reflective LCD displays, a matrix of micro-mirrors is imaged as a whole onto the projection display to get a 2 dimensional image. The 2-D array of mirrors are less sensitive to the mirror surface curvature and scan with more uniformity than scanners using a 1-D array or raster-scanned displays. Moreover, the electronic throughput is lower and spatial resolution is better.

In grating light valve displays, a line of pixel is made of a 1-dimensional array of light modulators whose the image is swept over a screen by a scanning mirror to get a 2-dimensional image.

A disadvantage of 1-D or 2-D pixel array displays is that they require successful fabrication of many elements while raster-scanned display requires only one element.

Raster-scanned displays can be made smaller and at less cost than 2-D and 1-D scanned displays, making them more appealing for portable display applications.

Prior art, full electrostatic driven single mirror arrangements with electrodes underneath the mirror provide some degree of linearization. However, these scanners suffer from cross-talk, high voltage driving, and are difficult to package at the wafer level.

Prior art, 2-D gimbals suspended mirror with electrodes in the chip plane have simplified packaging with low pressure cavity at the wafer level, high frequency operation at low power driving, and allow independent excitation of both axis and the doesn't suffer from cross talk. However, these are difficult to manufacture and are fragile. The mirrors have low driving torques. As a result, both axes must be actuated in resonance so the oscillations are nonlinear. High Q factor and manufacturing tolerances make it virtually impossible to drive synchronously both axes at predefined frequencies. Moreover, low oscillation frequency value leads to fragile device because of long suspension hinges.

Existing miniaturized optical scanning for projection displays are expensive and power hungry. The current emerging display technologies target large format displays and do not meet the weight and power requirements of mobile applications. There is a need for durable, lightweight, low-power, inexpensive video displays that can be readily manufactured.

BRIEF SUMMARY

In some embodiments, a solid state scanner is easily aimed using a bright line of light.

In some embodiments, a solid state scanner is configured to enable imaging and lighting plane alignment at a far field.

In some embodiments, a solid state scanner is configured to reduce tilt dependence around the Z-axis.

In some embodiments, the lighting path of a 1D/2D stacked bar code solid state reader is very thin and is embedded in the 3D volume of view. Physical pixel height is large to aid imaging plane alignment. A selective filter centered on the lighting wavelength is placed in the image path. The filter can be on the photosensor 10, in the lens, or between the photosensor 10 and the lens.

The height of the pixels is artificially reduced to m*w, where m is the lens magnification and w is the light thickness. Thus, spatial resolution is no longer a function of the actual pixel size and aperture height but depends only on the thickness of the image of the light path. Furthermore, the tolerance of the tilt angle is improved.

In some embodiments, a scanner provides a light beam that is thin. As a result, the light beam is brighter and the aiming function of the scanner is improved. All the light is included in a 3D volume of view and all rays backscattered by the barcode that enters an optic aperture impinge on pixels. This optimizes the coupling efficiency between the lighting and light converter.

In some embodiments, a laser scanner utilizes 2D resonant electrostatic micro-mirror to enable projection or acquisition of a discrete image. Diagonal progressive scanning is used to maximize the frequency values so shock resistance can be increased. Effective eigenfrequencies are tuned by a constant dc voltage added to the driving clocks. Compared to prior art interleaved scanning, the inventive progressive scanning is free of line crawl, interline twitter, field aliasing.

DETAILED DESCRIPTION

Figure 1:
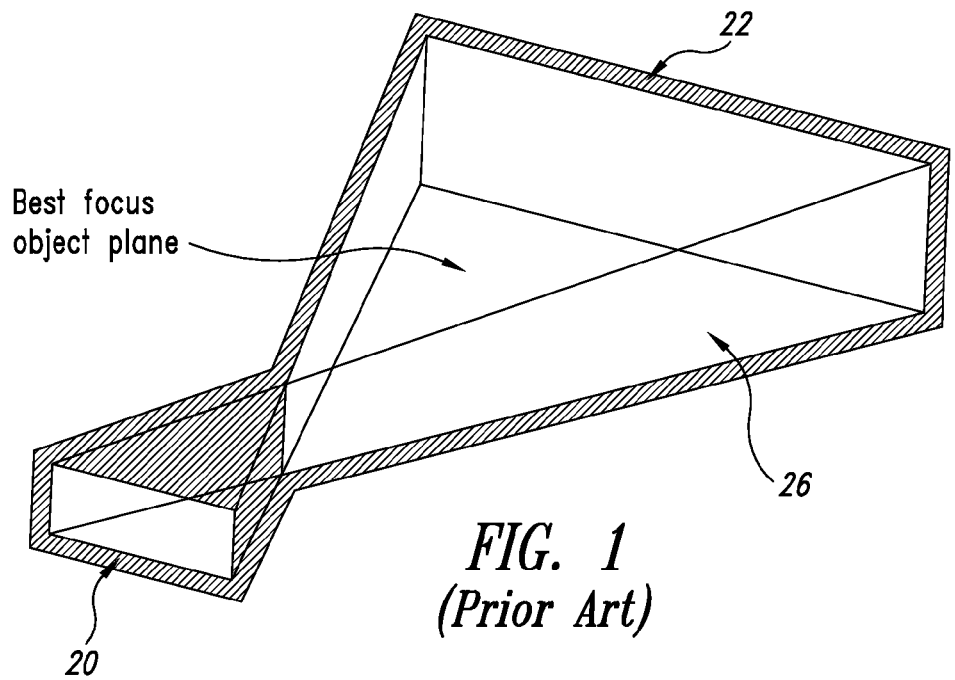
FIG. 1 is a prior art scanner utilizing a prior art scanning method.
Figure 2:
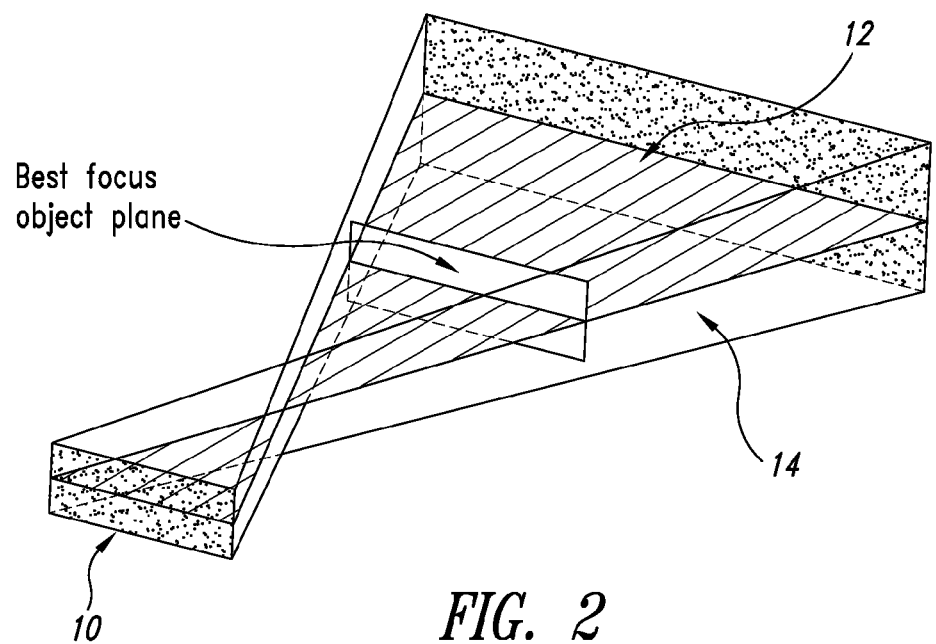
FIG. 2 is an isometric view of a 3D volume defined by a field of view of a scanner and a photosensor, according to one illustrated embodiment.

FIG. 2 shows an isometric view of a 3D volume defined by a field-of-view 14 of a scanner (not shown) having a photosensor 10 for detecting light in a light path 12. The photosensor 10 includes a number of pixels having a pixel height.

A linear CCD (charge coupled device) or CMOS (complimentary mental oxide semiconductor) scanner or bar code reader is used to read 1D/2D stacked bar codes. Light path 12 is thin relative to 3D volume of the field-of-view 14 and is within the 3D volume of the field-of-view 14. The physical pixel height of the photosensor 10 is enlarged without increasing the number of pixels to help optical and imaging plane alignment. A selective filter (not shown) centered on the wavelength of the light is placed in the image path. The filter can be placed on the photosensor 10, in a lens (not shown) of the scanner or between the photosensor 10 and the lens. The respective heights of the pixels illuminated may be artificially induced to m*w, where m is the lens magnification and w is the thickness of the light in light path 12.

Spatial resolution is no longer a function of the actual pixel aperture height. Instead, spatial resolution depends only on the thickness of the image of the light path 12. As a result, tilt angle tolerance of the scanner is improved. Furthermore, all the light is included in the 3D volume of field-of-view 14 and all rays backscattered by the bar code enter an optical aperture of the scanner and impinge on the pixels in the photosensor 10. This optimizes the coupling efficiency between light rays scattered by the bar code and light detected by the photosensor 10.

A light beam (not shown) from the scanner is in the light path 12, which is thin relative to the 3D volume of the field-of-view 14 of the scanner. The light beam is thin, and consequently the light beam is bright and so the aiming function of the scanner is improved. Because the light beam is bright, line of sight aiming is easy. This allows imaging and lighting plane alignment at a far filed. Further, tilt dependence is reduced around the Z-axis.

Figure 3:
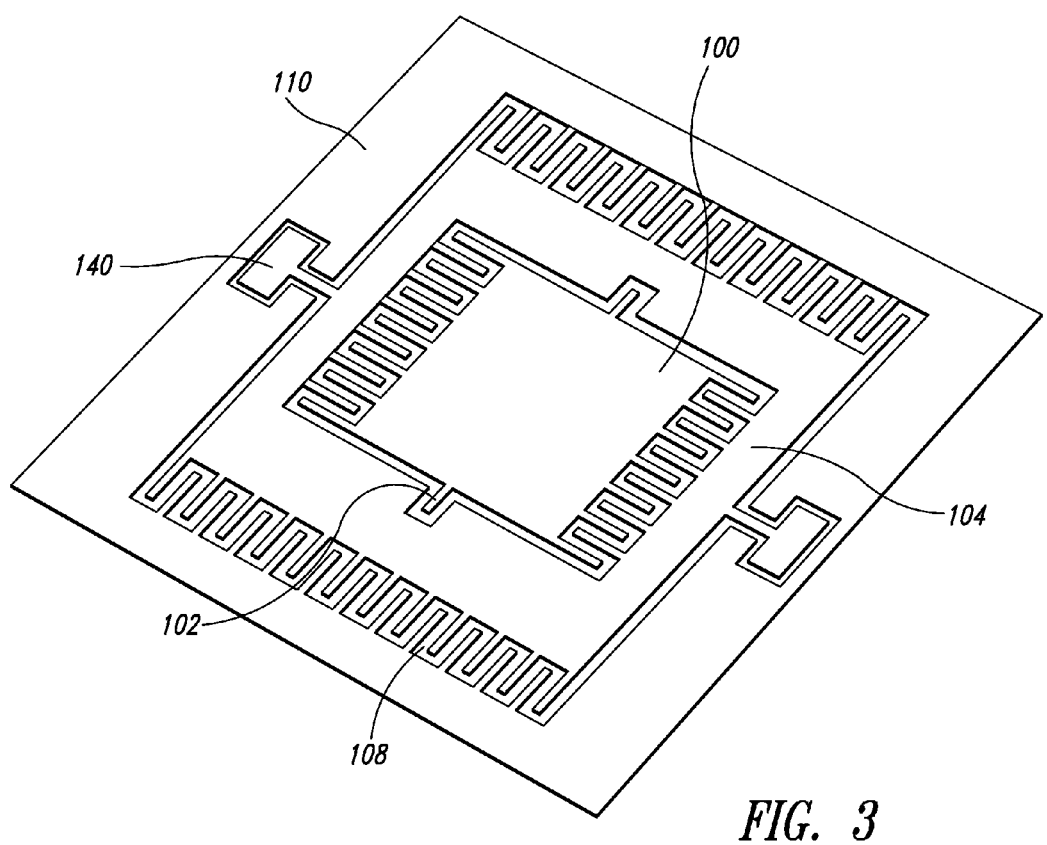
FIG. 3 is an isometric view of a resonant electrostatic micro-structure, according to one illustrated embodiment.
Figure 4:
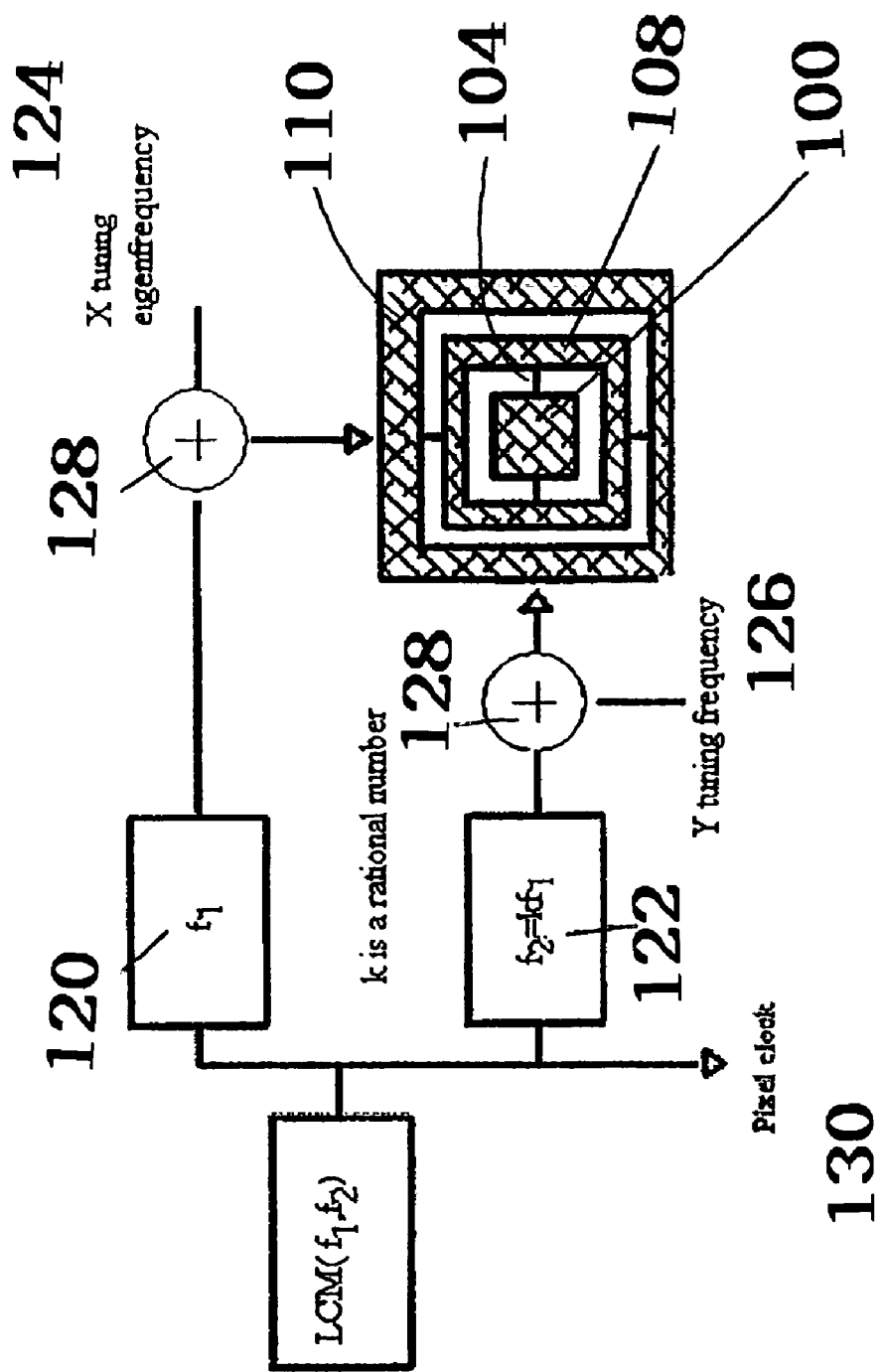
FIG. 4 is a block diagram of selected components of a laser scanner, according to one illustrated embodiment.
Figure 5B:
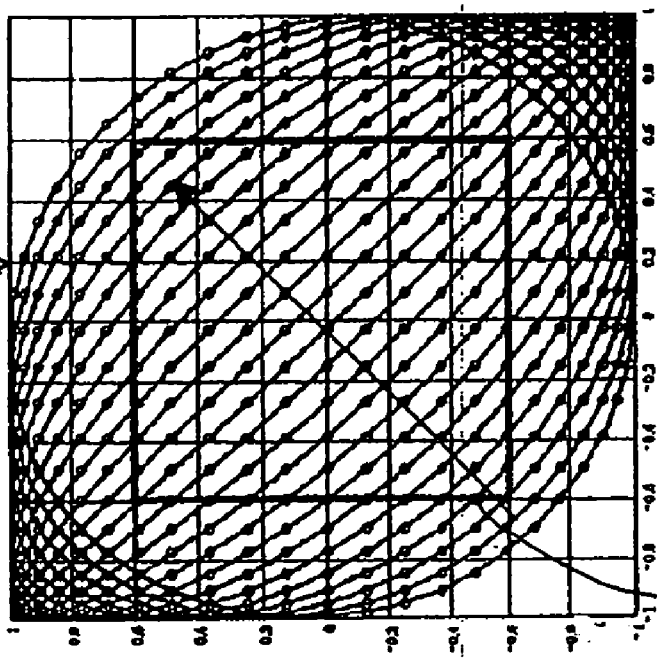
FIGS. 5a and 5b show scanning directions, according to one illustrated embodiment.
Figure 5A:
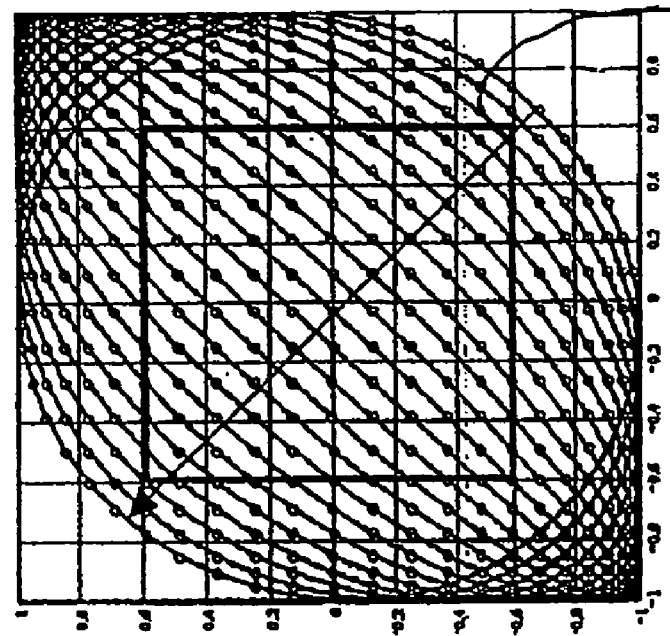

Turning now to FIGS. 3-5, an embodiment of the laser scanner utilizes a 2D resonant electrostatic micro-structure 101 to enable projection or acquisition of a discrete image. Diagonal progressive scanning may be used to maximize the frequency values so shock resistance can be increased. Effective eigenfrequencies are tuned by a constant dc voltage added to the driving clocks. Compared to prior art interleaved scanning, the progressive scanning is free of line crawl, interline twitter, field aliasing.

The resonant micro structure 101 is formed from a wafer 103 and has a gimbal structure. The resonant micro-structure 101 includes electrodes 104 in the plane of the resting position 106 of the wafer, a movable frame 108, a static frame 110, and a mirror 100. The static outer frame 110 is anchored 140 to the scanner. The mirror 100 is in the moveable frame 108, which is rotably connected to the outer static frame 110 at anchor 140. Mirror 100 is connected in a gimbal structure by torsional springs 102 to the movable frame 108. A laser beam is projected toward the mirror 100 and deflected in two directions, x and y, as the mirror 100 oscillate.

Two driving clocks 120, 122 are used to control the oscillations of mirror 100 of the microstructure 101. Two digital counters dividing a common clock are used to deliver accurate driving clocks 120, 122. The two digital counters are driven by a master clock 130.

Driving clocks 120, 122 that drive mirror 100 have frequency values in exact proportion of a rational number (i.e., a fraction of two integers) close to unity. In one case, k=16 1/n where n is a natural number. This is results in Lissajou pattern where lines are sequentially traced in a progressive manner. Alternatively, the two driving clocks have a frequency values in exact proportion of a rational number less than unity.

Two digital counters dividing a common clock deliver accurate driving clocks. The X and Y effective eigenfrequencies 124, 126 are matched to driving clocks 120, 122 by adding a DC voltage 128 to driving clocks 120, 122 which changes the effective stiffness of torsional springs 102. This tuning is close-looped to the detection of a minimum amplitude oscillation. The scan field is adjusted by varying the voltage amplitude of the driving clock with a response time longer that the eigenfrequencies tuning.

An advantage of having a k value close to or less than 1 is that one gets progressive scanning along the diagonals of the image, while avoiding disadvantages of interleaved scanning.

Another advantage of low k factor value is that the oscillation frequencies can be maximized. Further, even with a low inertia limited mirror surface the microactuator is robust.

The driving oscillation command is preferably generated with two digital counters driven by a master clock 130 whose the value is a common multiple of the x- and y-oscillations. Preferably, the frequency value of the master clock 130 is the least common multiple of the x- and y-oscillations.

For example, with $k=A/N=1+\frac{1}{2}n$, the beam will trace a first stack of n lines along first diagonal 132 of the image, then a second stack of n lines along second diagonal 134. Master clock 130 is the least common multiple of (f1, $(1+\frac{1}{2}n)$f2). Master clock 130 is also used as a sampling clock.

The grid pitch is distributed with an x- and y-sine coefficient. Pin cushion distribution 136 of the beam is predictable because of the pure resonant oscillation lead by electrodes 104 in the plane 106 of the wafer. Image linearization in image memory, both before projection for display device and/or after acquisition for image capture, is possible by utilizing interpolation.

An alternative method to obtain a quasi-isometric grid distribution is to truncate the field of scan so as to limit the pitch variation. However, this method results in a reduced effective field of scan. In the alternative method, one must also correct too the opto-mechanical distortion if the incident laser beam is not normal to the mirror.

The invention claimed is:

1. A method for scanning a bar code with a bar code scanner having a three-dimensional (3D) field-of-view encompassing a bar code, comprising:
    illuminating a bar code with an illumination source having a lighting wavelength and a thin, bright lighting path produced by moving a beam of light;
    embedding said lighting path in a first 3D volume of view of the bar code;
    passing backscattered light from the bar code through a filter centered on the lighting wavelength;
    sensing the light backscattered from the bar code by pixels of an array of pixels illuminated by the backscattered light, each illuminated pixel having a respective pixel height and a respective pixel width;
    artificially reducing the respective pixel height of illuminated pixels in the pixel array to a respective effective pixel height of m*w, where m is the magnification of a lens in a scanner and w is the thickness of the lighting path; and
    decoding the bar code.

2. The method of claim 1 wherein the bar code scanner comprises:
    an illumination source that emits the beam of light;
    the lens positioned such that light emitted by the illumination source passes through the lens into the lighting path, which is thin relative to the 3D field-of-view encompassing the bar code;
    a photosensor comprising the array of pixels; and
    the filter located in front of the sensor, between the lens and the sensor or on the lens.

3. The method of claim 2 wherein said bar code is located at a far field from the scanner.

4. The method of claim 1 wherein said bar code is located at a far field from the scanner.

5. The method of claim 1 wherein illuminating a bar code with an illumination source having a lighting wavelength and a thin, bright lighting path produced by moving a beam of light comprises scanning a width of the bar code and a portion of a height of the bar code with the beam of light in the lighting path.

6. The method of claim 5 wherein embedding said lighting path in a first 3D volume of view of the bar code comprises embedding the lighting path within a second 3D volume that is smaller than and is encompassed by the 3D field-of-view encompassing the bar code.

7. The method of claim 1 wherein artificially reducing the respective pixel height of illuminated pixels in the pixel array to respective effective pixel height of m*w comprises focusing the light backscattered from the bar code onto a portion of the array of pixels.

8. The method of claim 7 wherein focusing the light backscattered from the bar code onto a portion of the array of pixels comprises focusing the light backscattered from the bar code across a width of the array of pixels and onto a portion of the height of the pixels such that the effective height is less than the height of the pixels.

9. A method for scanning a bar code having a height and a width, the method comprising:
    driving a mirror to oscillate about a first axis at a first frequency, $f_1$;
    driving the mirror to oscillate about a second axis at a second frequency, $f_2$, where $f_2=k*f_1$, and k is a rational number;
    reflecting a laser light from the oscillating minor, the reflected laser light having a wavelength and a thickness w;
    illuminating the width of the bar code with the light reflected from the moving mirror, wherein only a portion of the height of the bar code is illuminated;
    passing the laser light backscattered from the illuminated portion of the bar code through a filter centered on the wavelength of the laser light;
    receiving the filtered backscattered light at a portion of an array of pixels, wherein the array of pixels has an array width and each pixel has a respective pixel height, wherein the filtered backscattered light is received by only a portion of the respective pixel height of each pixel that receives the filtered backscattered light; and
    decoding the bar code.

10. The method of claim 9, further comprising:
    progressively scanning the bar code.

11. The method of claim 9 wherein k is less than 1.

12. The method of claim 9 wherein $f_1$ and $f_2$ are eigenfrequencies of the mirror.

13. The method of claim 9 wherein $f_1$ and $f_2$ are eigenfrequencies of the mirror.

14. The method of claim 9 wherein the portion of the array of pixels that receives the filtered backscattered light includes the array width of the array of pixels.

15. The method of claim 9 wherein the bar code is scanned by a scanner having a field-of-view, the field-of-view encompassing the bar code, wherein the thickness, w, of the reflected laser light is thin relative to the field-of-view.

16. The method of claim 15 wherein the spatial resolution of the scanner depends only on the thickness, w, of the reflected laser light.

17. A method for scanning a bar code having a height and a width, the method comprising:
    oscillating a mirror about a first axis at a first frequency, $f_1$;
    oscillating the mirror about a second axis at a second frequency, $f_2$;
    reflecting a laser light having a wavelength and a thickness w from the oscillating mirror;
    illuminating the width of the bar code and only a portion of the height of the bar code with the laser light reflected from the oscillating mirror;

receiving laser light backscattered from the illuminated portion of the bar code at an array of pixels, wherein each pixel of the array of pixels has a respective pixel height, wherein the backscattered laser light is received by only a portion of the respective pixel height of each pixel that receives the backscattered laser light; and decoding the bar code.

18. The method of claim 17, further comprising:

progressively scanning the bar code.

19. The method of claim 17 wherein $f_1$ and $f_2$ are eigenfrequencies of the mirror.

20. The method of claim 17 wherein oscillating a mirror about a first axis at a first frequency, $f_1$, includes driving the mirror about the first axis at the first frequency, $f_1$, and wherein oscillating the mirror about a second axis at a second frequency, $f_2$, includes driving the mirror about the second axis at the second frequency, where $f_2$ is different from $f_1$, and where $f_2=k*f_1$, and k is a rational number.

21. The method of claim 20 wherein $f_1$ and $f_2$ are eigenfrequencies of the mirror.

22. The method of claim 17 wherein receiving laser light backscattered from the illuminated portion of the bar code at array of pixels includes receiving laser light backscattered from the illuminated portion of the bar code across the width of the pixel array.

23. The method of claim 17 wherein the bar code is scanned by a scanner having a field-of-view, the field-of-view encompassing the bar code, wherein the thickness, w, of the reflected laser light is thin relative to the field-of-view.

24. The method of claim 17 comprising passing laser light backscattered from the illuminated portion of the bar code through a filter centered on a wavelength of the laser light.

* * * * *